(12) United States Patent
Kim

(10) Patent No.: US 9,049,544 B2
(45) Date of Patent: Jun. 2, 2015

(54) METHOD FOR SUPPLYING LOCAL SERVICE USING LOCAL SERVICE INFORMATION SERVER BASED ON DISTRIBUTED NETWORK AND TERMINAL APPARATUS

(75) Inventor: Jun Hyeong Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 13/102,447

(22) Filed: May 6, 2011

(65) Prior Publication Data

US 2012/0039317 A1 Feb. 16, 2012

(30) Foreign Application Priority Data

Aug. 16, 2010 (KR) ........................ 10-2010-0078829

(51) Int. Cl.
*H04W 4/02* (2009.01)
*G06F 17/30* (2006.01)
*H04L 29/12* (2006.01)

(52) U.S. Cl.
CPC ............. *H04W 4/02* (2013.01); *G06F 17/3087* (2013.01); *H04L 61/2015* (2013.01)

(58) Field of Classification Search
None
See application file for complete search history.

(56) References Cited

U.S. PATENT DOCUMENTS

| | | | |
|---|---|---|---|
| 2002/0010758 A1* | 1/2002 | Chan | 709/218 |
| 2003/0005077 A1* | 1/2003 | Krishnan | 709/217 |
| 2003/0009583 A1* | 1/2003 | Chan et al. | 709/236 |
| 2004/0029577 A1* | 2/2004 | Clark et al. | 455/422.1 |
| 2004/0139049 A1* | 7/2004 | Hancock et al. | 707/1 |
| 2005/0148342 A1* | 7/2005 | Sylvain | 455/456.3 |
| 2005/0253718 A1* | 11/2005 | Droms et al. | 340/572.1 |
| 2005/0266827 A1* | 12/2005 | Kim | 455/411 |
| 2008/0004888 A1* | 1/2008 | Davis et al. | 705/1 |
| 2008/0233927 A1* | 9/2008 | Moon et al. | 455/414.1 |
| 2009/0003281 A1* | 1/2009 | Panabaker | 370/331 |
| 2009/0106778 A1* | 4/2009 | Pomeroy et al. | 719/328 |
| 2010/0227596 A1* | 9/2010 | Suresh | 455/414.2 |
| 2011/0081922 A1* | 4/2011 | Chandra et al. | 455/457 |
| 2011/0125820 A1* | 5/2011 | Lin | 709/201 |
| 2012/0089713 A1* | 4/2012 | Carriere | 709/222 |
| 2012/0315884 A1* | 12/2012 | Forutanpour et al. | 455/414.2 |
| 2013/0219021 A1* | 8/2013 | Acharya et al. | 709/219 |

FOREIGN PATENT DOCUMENTS

| | | |
|---|---|---|
| JP | 2003-111124 | 4/2003 |
| JP | 2008-278138 | 11/2008 |
| KR | 10-2001-0077322 | 8/2001 |
| KR | 10-2002-0046769 | 6/2002 |

\* cited by examiner

*Primary Examiner* — Otis L Thompson, Jr.
(74) *Attorney, Agent, or Firm* — NSIP Law

(57) ABSTRACT

Provided are a method and apparatus for supplying a local service (LS) using a LS information server that is based on a distributed network. The LS may be supplied to the terminal through at least one of an LS information server, a root server, and a neighboring LS information server.

20 Claims, 12 Drawing Sheets

METHOD FOR SUPPLYING LOCAL SERVICE USING LOCAL SERVICE INFORMATION SERVER BASED ON DISTRIBUTED NETWORK AND TERMINAL APPARATUS

CROSS-REFERENCE TO RELATED APPLICATION(S)

This application claims the benefit under 35 U.S.C. §119 (a) of Korean Patent Application No. 10-2010-0078829, filed on Aug. 16, 2010, in the Korean Intellectual Property Office, the entire disclosure of which is incorporated herein by reference for all purposes.

BACKGROUND

1. Field The following description relates to a technology for providing a local service (LS) to a terminal using an LS information server based on a distributed network.

2. Description of Related Art

With the development of mobile communication and near field communication (NFC) technologies, the Internet has become accessible to a terminal at just about anytime and anywhere. A terminal is capable of being supplied with a local service (LS) that is provided in a region where the terminal is located.

In a centralized network structure, a central server may supply the terminal with information about the LS of a plurality of regions. In this example, the central server may be located in the Internet and the terminal may freely connect to the server regardless of time and place.

However, if a plurality of terminals request LS information of regions in which the respective terminals are located, excessive traffic may occur on the central server, causing a single point of failure (SPOF). In this example, the entire centralized network may not operate.

Accordingly, there is a demand for a technology that is capable of supplying LSs to a plurality of terminals by dispersing and/or reducing the traffic concentrated on the central server.

SUMMARY

In one general aspect, there is provided a method for providing a local service (LS), the method including acquiring position information of a terminal, requesting an LS information server for LS information about a region in which the terminal is located by inserting the acquired position information of the terminal in a field of a message and transmitting the message to the LS information server, receiving LS information, and displaying the LS information received in response to the request.

The LS information server may be a distributed LS information server.

The method may further comprise requesting the LS information server for remote LS information, displaying the remote LS information received from the LS information server, and supplying a LS selected from the displayed remote LS information.

The LS information server and at least one neighboring LS information server may share LS information about a region in which the LS information server is located and the LS information of a region in which the neighboring LS information server is located, and the neighboring LS information server may be located in a region that is adjacent to the region in which the terminal is located.

The receiving LS information may comprise receiving information about a root server from the LS information server, in response to the request for the remote LS information, and the method may further comprise requesting, based on the received root server information, remote LS information from the root server, displaying the remote LS information received from the root server, and supplying a LS selected from the displayed remote LS information.

The receiving LS information may comprise receiving root server information from the LS information server, in response to the request for the remote LS information, and the method may further comprise requesting the root server for information about a neighboring LS information server that is located in a region that is adjacent to the region in which the terminal is located, requesting the neighboring LS information server for remote LS information based on the neighboring LS information server information received from the root server, displaying the remote LS information received from the neighboring LS information server, and supplying a LS selected from the displayed remote LS information.

The receiving LS information may comprise receiving information about a root server from the LS information server, in response to the request for the remote LS information, and the method may further comprise requesting the root server for remote LS information based on the received root server information, receiving information of a neighboring LS information server in response to the requested remote LS information, requesting the neighboring LS information server for the remote LS information based on the received neighboring LS information server information, displaying the remote LS information received from the neighboring LS information server, and supplying a LS selected from the displayed remote LS information.

In response to the terminal moving from a region in which the LS information server is located to a neighboring region in which a neighboring LS information server is located, the method may further comprise requesting the LS information server for LS information about the region in which the terminal is located, receiving information of the neighboring LS information server that is located in the neighboring region, from the LS information server, requesting the neighboring LS information server for the LS information about the region in which the terminal is located based on the received neighboring LS information, and receiving an LS information of the region in which the terminal is located from the neighboring LS information server.

The method may further comprise displaying the LS information, wherein the LS information includes at least one of summaries of the LS, a method for connection to the localized wireless network (LWN), a method for connection with the LS server, and use of the LS.

The method may further comprise requesting a dynamic host configuration protocol (DHCP) server for information about the LS information server, wherein the requesting of the LS information comprises requesting the LS information about the region in which the terminal is located based on the LS server information received in response to the request.

In another aspect, there is provided a terminal including a position information acquisition unit to acquire position information of the terminal, an information request unit to request a LS information server for information about a region in which the terminal is located, by inserting the acquired terminal position information into a message, and an information supply unit to supply a LS selected by a user, based on received LS information.

The information request unit may request the LS information server for remote LS information, and the information supply unit may display the remote LS information received from the LS information server and supply a LS selected from the displayed remote LS information.

The LS information server and at least one neighboring LS information server may share LS information of a region in which the LS information server is located and the LS information of a region in which the neighboring LS information server is located, and the neighboring LS information server may be located in a region that is adjacent to the region in which the terminal is located.

The information supply unit may comprise an information reception unit to receive information of a root server in response to remote LS information requested from the LS information server, and to receive the remote LS information requested from the root server, a display unit to display the received remote LS information, and a connection unit to connect the terminal to the LS selected based on the displayed remote LS information.

The information supply unit may comprise an information reception unit to receive information of a root server, and to receive information of a neighboring LS information server from the root server, and a display unit to display the remote LS information received from the neighboring LS information server.

The information request unit may request the LS information server for LS information of the region in which the terminal is located and request a second LS information server located in the neighboring region for the LS information about the region in which the terminal is located, and the information supply unit may supply LS information about the region in which the terminal is located, received from the second LS information server.

The terminal may further comprise a display unit to display the LS information, wherein the LS information comprises at least one of summaries of the LS, a method for connection to the LWN, a method for connection with the LS server, and use of the LS.

The information request unit may request a DHCP server for information about the LS information server and request for the LS information of the region in which the terminal is located based on the LS server information received in response to the request.

In another aspect, there is provided an LS information server including an information reception unit to receive position information of a terminal and a request for LS information about a region in which the terminal is located, and to receive a request for remote LS information from the terminal, and an information supply unit to transmit the requested LS information to the terminal, and to supply at least one of information of a neighboring LS information and the remote LS information.

The LS information about the region in which the terminal is located may be shared with the remote LS information supplied by the neighboring LS information server, and the LS information server and the neighboring LS information server may be distributed servers.

The information supply unit may supply information of a root server to the terminal, in response to the received request for the remote LS information.

Other features and aspects may be apparent from the following detailed description, the drawings, and the claims.

Figure 1:
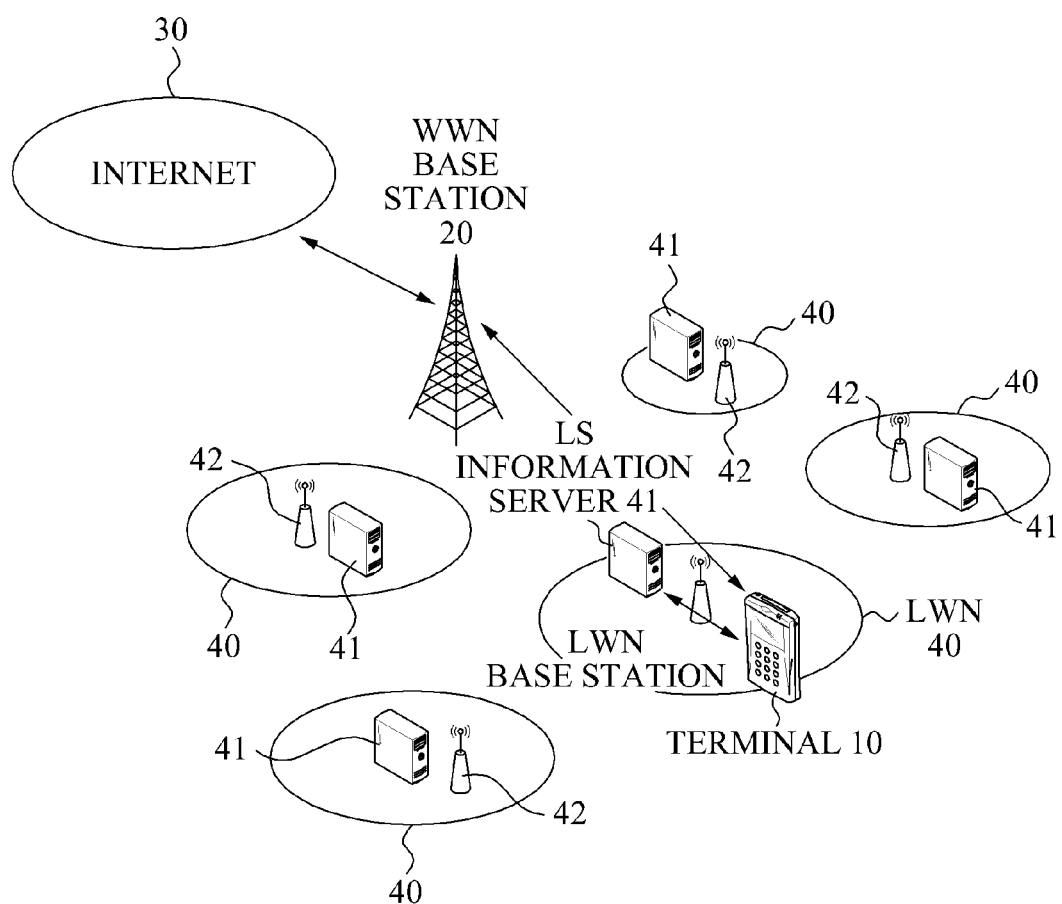
FIG. 1 is a diagram illustrating an example of a distributed network that includes a plurality of local service (LS) information servers and a terminal.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of a distributed network including a plurality of local service (LS) information servers and a terminal.

Referring to FIG. 1, terminal 10 may be a mobile terminal, for example, an IPHONE®, a smart phone, a digital multimedia broadcasting (DMB) phone, a net book, a notebook computer, a navigator, a personal computer, a laptop computer, and the like.

The distributed network in FIG. 1 includes a localized wireless network (LWN) base station 42 that supplies a communication connection between an LWN 40 and the terminal 10, a plurality of local service (LS) information servers 41 that supply LS information, and a wideband wireless network (WWN) base station 20 that supplies a communication connection for the terminal 10 to access the Internet 30. In this example, the plurality of LS information servers 41 are disposed in each of a plurality of regions included in the distributed network. For example, the LS information servers 41 may store the LS information of corresponding regions, in a database. For example, the LWN may include wireless networks such as a WI-FI® hot spot, a BLUETOOTH® hot spot, a femto cell, a pico cell, and the like.

The terminal 10 may be capable of performing voice communication, video communication, and data communication using the WWN. The terminal 10 may acquire LS information using the WWN and then use the selected LS using the LWN 40. For example, the LS may include an information guide service for a region in which the terminal 10 is located, a coupon service that supplies coupons of stores located in the region, a ticketing service for purchase of tickets from stores that are located within the region, and the like. The information guide service may include information about stores that are located in the region, information about tourist spots, information about a history of the region, traffic information of the region, and the like.

Although FIG. 1 illustrates the distributed network including a single terminal for convenience of description, the distributed network is not limited thereto and may include a plurality of terminals. For example, LS information servers of the region in which the plurality of terminals are located may supply LS information of the corresponding regions to the plurality of terminals, respectively.

Hereinafter, an example of supplying the LS information to a terminal using a distributed LS information server is further described with reference to FIG. 2.

Figure 2:
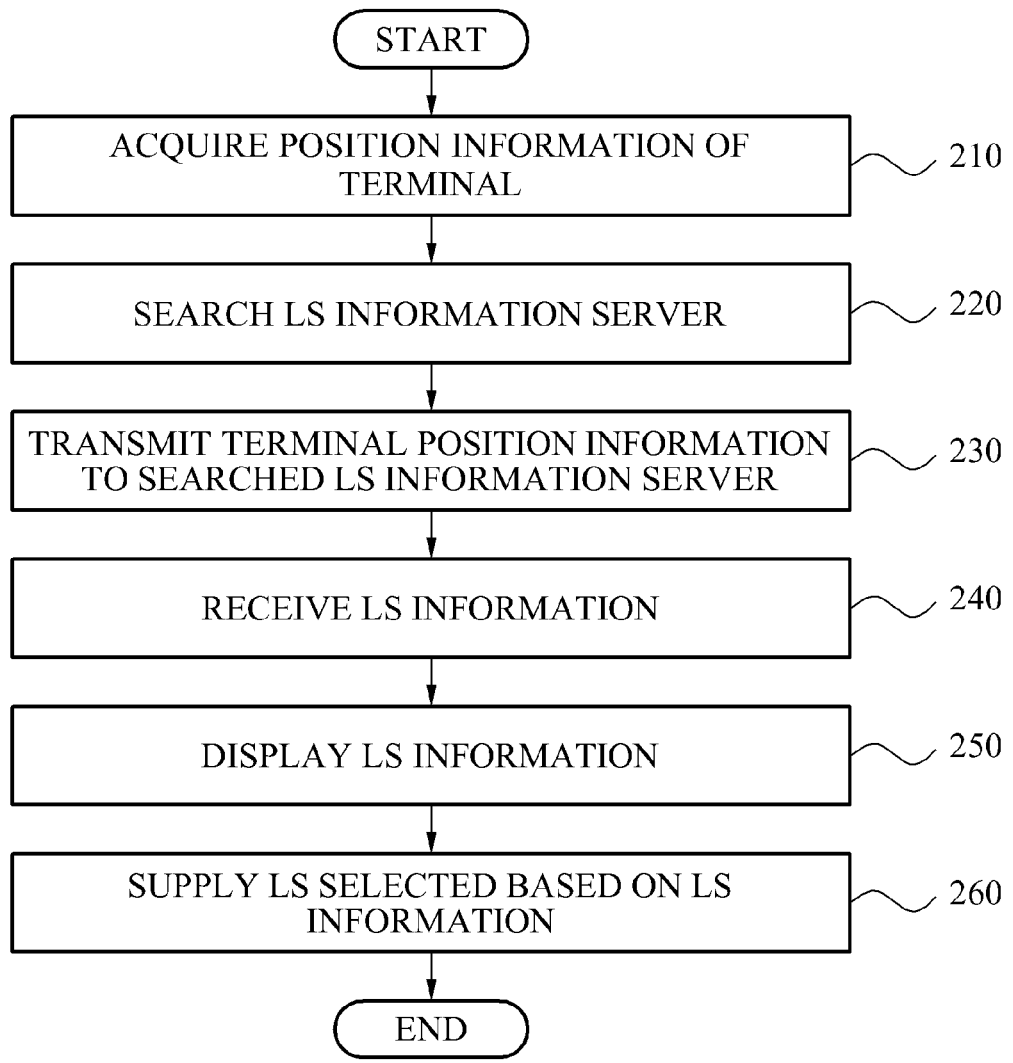
FIG. 2 is a flowchart illustrating an example of a method for supplying LS information to the terminal using a distributed LS information server.

FIG. 2 illustrates an example of a method for supplying LS information to the terminal using the distributed LS information server.

Figure 3:
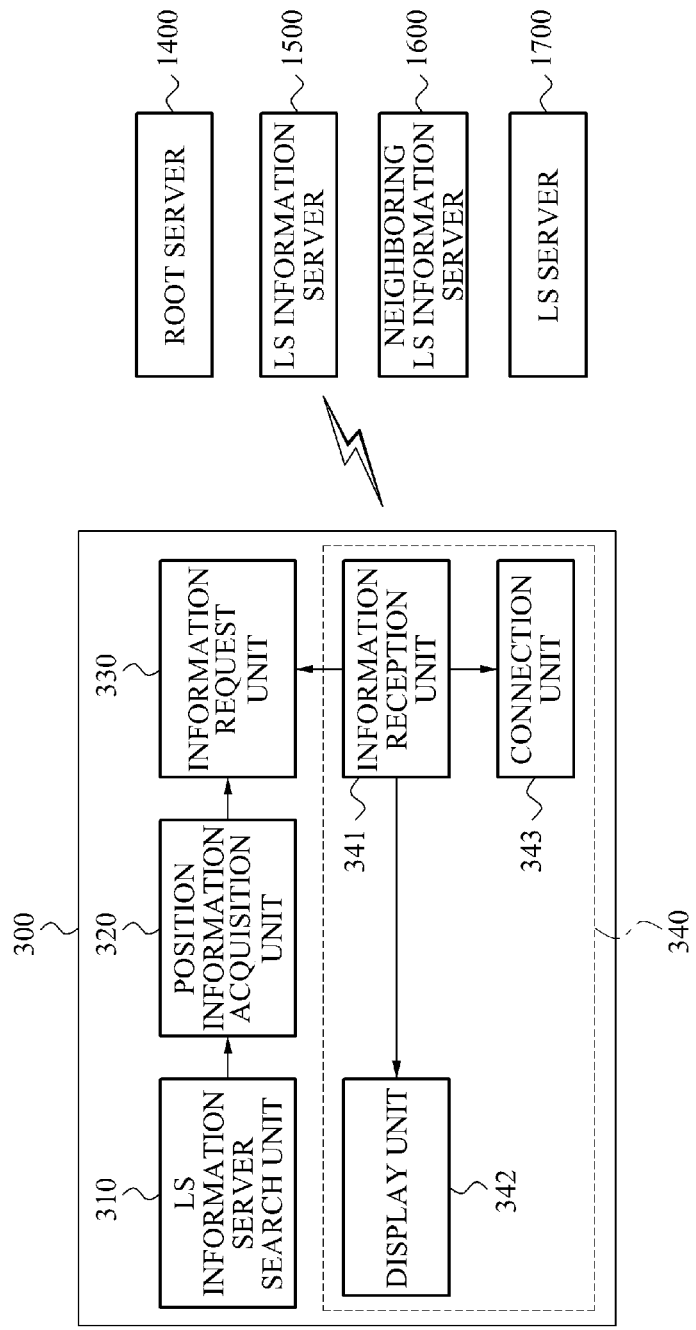
FIG. 3 is a diagram illustrating an example of a terminal based on a distributed network.

FIG. 3 illustrates an example of a terminal based on a distributed network.

Referring to FIG. 3, terminal 300 includes a server search unit 310, a position information acquisition unit 320, an information request unit 330, and an information supply unit 340. In this example, the information supply unit 340 includes an information reception unit 341, a display unit 342, and a connection unit 343.

Referring to FIGS. 2 and 3, in 210, the position information acquisition unit 320 acquires information on a position of the terminal using, for example, a global positioning system (GPS) module (not shown) that may be built in the terminal 300.

For example, the position information acquisition unit 320 may acquire the position information of the terminal 300 through communication between the GPS module and a GPS satellite (not shown) to obtain position coordinates.

In 220, the server search unit 310 searches for an LS information server 1500 that is in a region in which the terminal 300 is located. In this example, the LS information server 1500 may be located in the region in which the terminal 300 is located.

In 230, the information request unit 330 transmits the position information of the terminal that is acquired by the searched LS information server 1500. For example, the LS information server 1500 may transmit the LS information of the terminal-located region to the terminal 300, based on the position information of the terminal 300.

The information reception unit 341 receives the LS information of the terminal-located region from the LS information server 1500, in 240.

For example, the LS information may include summaries of the LS, a method for connecting to the LWN, a method for connecting with the LS information server 1500, use information about the LS, and the like. The summaries of the LS may introduce contents of the LS to be supplied, in the form of a webpage. As another example, the summaries of the LS may include at least one of texts, images, video, and music. The method for connecting to the LWN may include an address of the LWN. The method for connecting with the LS information server 1500 may include an address of the LS information server 1500. The use of the LS may include a port number and a transport protocol.

In 250, the display unit 342 displays the received LS information of the terminal-located region.

The information supply unit 340 supplies the LS selected based on the received LS information, in 260.

For example, an operation unit (not shown) may receive a user's selection about the LS based on the LS summaries from among the displayed LS information. In this example, the connection unit 343 may connect with the LWN using the LWN connection method included in the LS information. Also, the connection unit 343 may connect with the LS server that supplies the LS using the LS server connection method that is included in the LS information. Accordingly, the connection unit 343 may achieve a connection with the LS selected through the LWN.

As an example, if the selected LS is the coupon service, the connection unit 343 may connect the terminal 300 to a coupon providing webpage. In this example, the terminal 300 may use the coupon service by printing a coupon, downloading a coupon, and the like.

The terminal 300 may receive remote LS information of a neighboring region of the terminal-located region. For example, the terminal 300 may supply a remote LS that is selected based on the remote LS information. The terminal 300 may supply the remote LS information using, for example, at least one of a neighboring LS information server 1600, a root server 1400, and/or the LS information server 1500, which are further described hereinafter.

Figure 5:
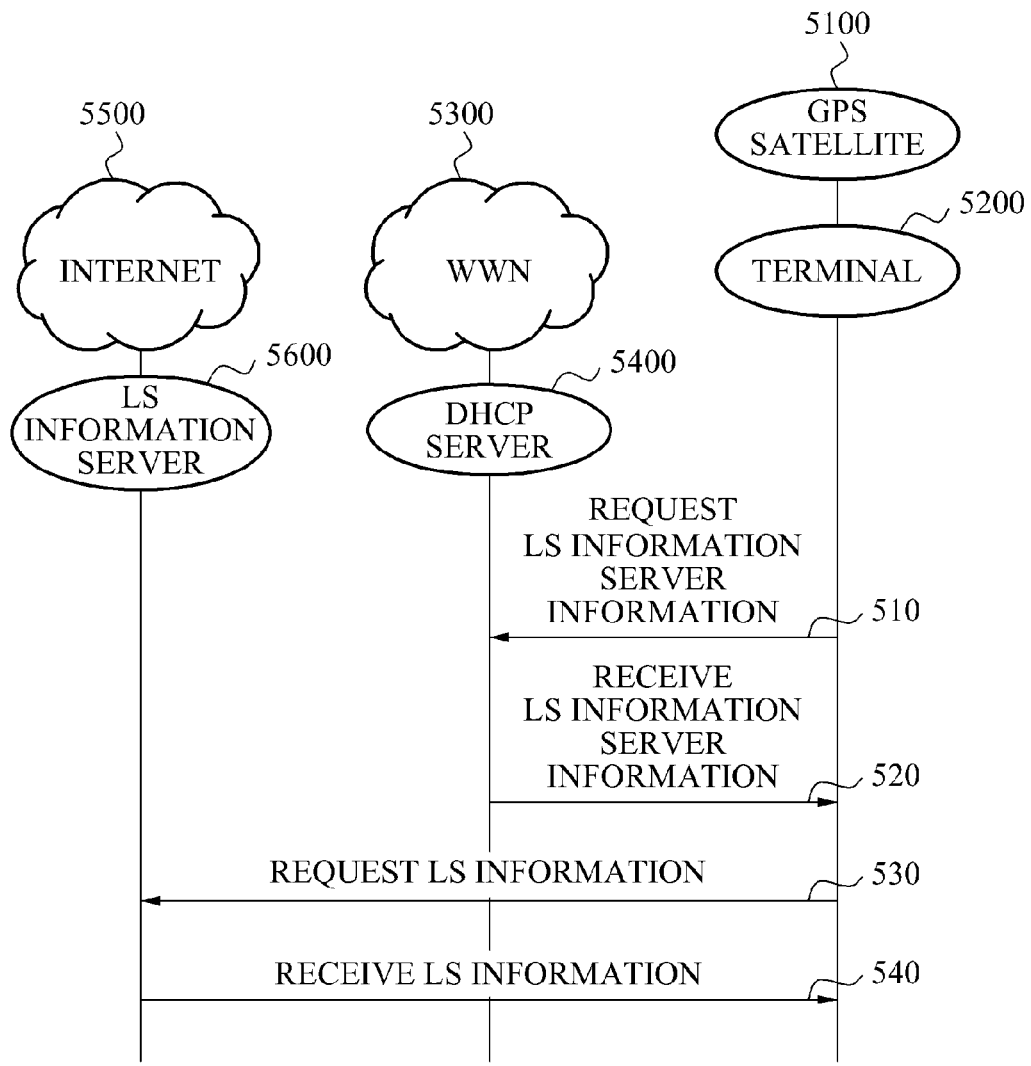
FIG. 5 is a diagram illustrating an example of a process for supplying LS information of a region in which a terminal is located.

FIG. 5 illustrates an example of a process for supplying LS information of a region in which a terminal is located.

Referring to FIG. 5, terminal 5200 may request an operator of the WWN for the LS information about the LS information server of that is located in the terminal-located region. Because the terminal 5200 has the same structure as the terminal 300 of FIG. 3, the same elements are cited by the same reference numerals.

Referring to FIGS. 5 and 3, in 510 the information request unit 330 of the terminal to 5200 requests LS server information from the dynamic host configuration protocol (DHCP) server 5400 using a WWN 5300. In this example, the DHCP server 5400 may be located in a core network of the WWN 5300. For example, the WWN 5300 may include a Long-term evolution (LTE), a WiBro network, and the like.

During the request, the information request unit 330 may transmit an option field that requests the LS server information using the option field in a DHCP message to request internet protocol (IP) setting information. For example, the information request unit 330 may request the DHCP server 5400 for the LS server information using the option field of a DHCPDISCOVER message or a DHCPREQUEST message.

As another example, the information request unit 330 may insert the terminal position information in the option field of the DHCPDISCOVER message or the DHCPREQUEST message using a request for comments (RFC) 3825 location configuration information (LCI) DHCP option. The information request unit 330 may transmit the DHCPDISCOVER message or the DHCPREQUEST message, in which the terminal position information is inserted, to the DHCP server 5400.

In 520, the information reception unit 341 receives the LS server information from the DHCP server 5400. For example, the information reception unit 341 may receive the LS server information using a DHCPOFFER message or a DHCP-PACK message. The DHCP server 5400 may transmit, to the terminal 5200, the LS server information that is inserted in an option field of the DHCPOFFER message or the DHCP- PACK message. The LS server information may include the address of the LS information server, such as an IP address. The DHCPOFFER message and the DHCPPACK message are response messages that are in response to the DHCPDISCOVER message and the DHCPREQUEST message, respectively.

In 530, the information request unit 330 requests the LS information server 5600 for the LS information about the terminal-located region, based on the received LS server information.

The information reception unit 341 receives the requested LS information from the LS information server 5600 through the Internet 5500, in 540. The display unit 342 may display the received LS information. The LS information may include the summaries of the LS, the LWN connection method, the LS information server connection method, use of the LS, and the like.

The connection unit 343 may connect with the LS that is selected based on the displayed LS information. For example, the connection unit 343 may connect to the LS that is selected based on the displayed LS summaries. The connection unit 343 may achieve the connection to the selected LS by connecting to the LS server and to the LWN, respectively, by the LS server connection method and the LWN connection method that are included in the LS information.

Although a request to the WWN operator for the LS server information has been described with reference to FIG. 5, as another example, the LS server information may be requested by a root server that is located on the Internet. As another example, the terminal may directly acquire the LS server information using a multicast protocol.

The process of receiving the LS information of the terminal-located region from the LS information server 5600 has been described with reference to FIG. 5. Hereinafter, a process of receiving the remote LS information as well as the LS information of the terminal-located region is described with reference to FIGS. 6 through 9.

Figure 6:
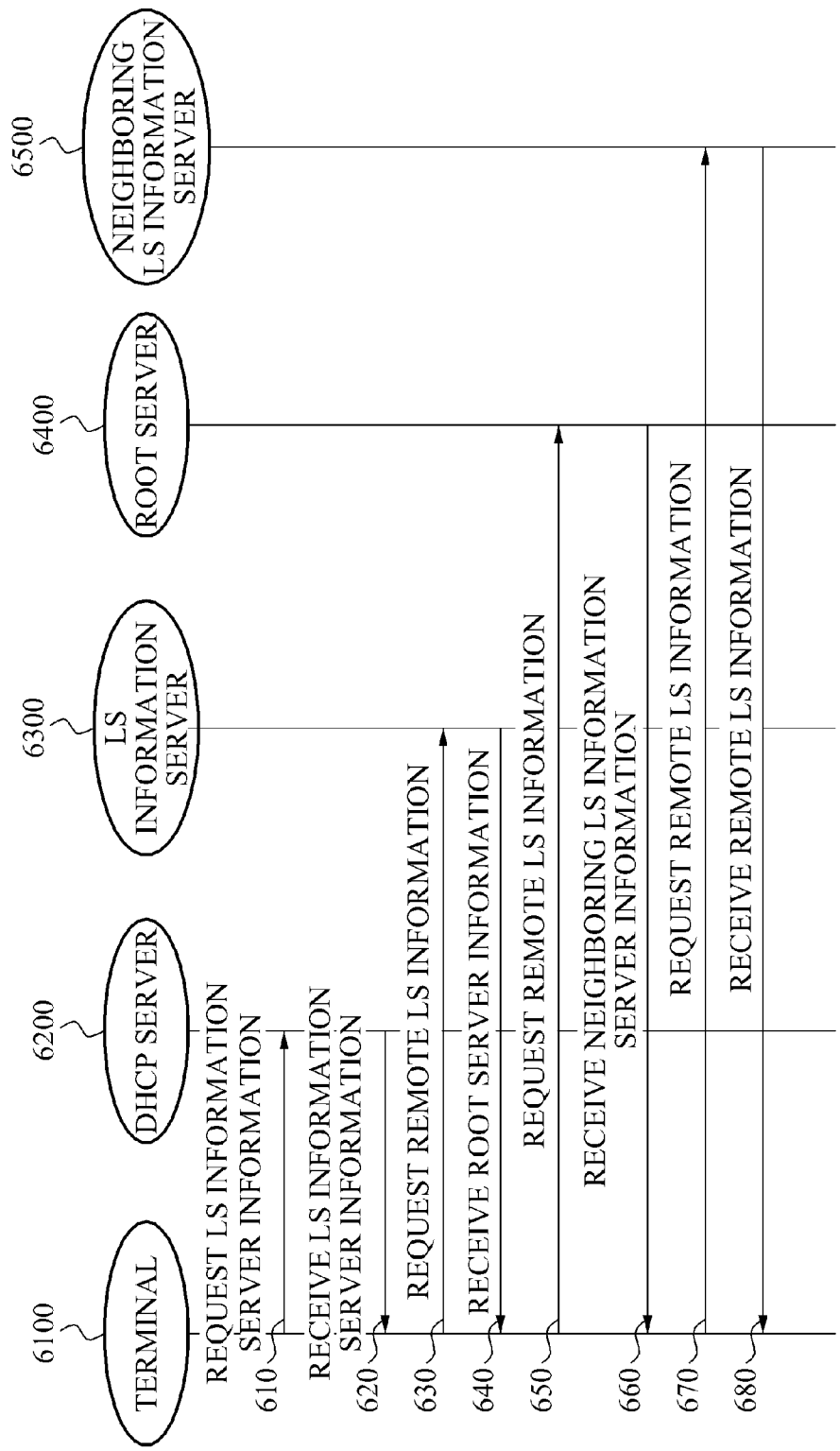
FIG. 6 is a flowchart illustrating an example of a process for supplying remote LS information using an LS information server, a root server, and a neighboring LS information server.

FIG. 6 illustrates an example of a process for supplying remote LS information using an LS information server, a root server, and a neighboring LS information server.

Referring to FIG. 6, the information request unit 330 of terminal 6100 requests the DHCP server 6200 for the LS server information, in 610.

For example, the information request unit 330 may transmit terminal position information to the DHCP server 6200 by inserting the terminal position information in a message and requesting the LS server information.

In 620, the information reception unit 341 receives the LS server information. For example, the LS server information may include the address of the LS information server, such as the IP address.

In 630, the information request unit 330 requests the LS information server 6300 for the remote LS information, based on the received LS server information. In this example, the remote LS information may be LS information that is supplied by the neighboring region of the region in which terminal 6100 is located.

In 640, the information reception unit 341 receives information about the root server 6400 from the LS information server 6300.

In this example, if the remote LS information is not stored in the LS information server 6300, the LS information server 6300 may transmit the root server information to the terminal 6100. For example, the root server information may include an address of the root server 6400. The root server 6400 may be a public server that provides information about LS information servers that are located in each region of the Internet. In this example, the root server 6400 may be a server that is aware of information about all LS information servers that are located in each region.

In 650, the information request unit 330 requests the root server 6400 for the remote LS information based on the received root server information.

The information reception unit 341 receives information about the neighboring LS information server 6500 from the root server 6400, in 660.

If the remote LS information is not stored in the root server 6400, the root server 6400 may transmit information about the neighboring LS information server 6500 to the terminal 6100. For example, the information about the neighboring LS information server 6500 may include an address of the neighboring LS information server 6500.

The information request unit 330 requests the neighboring LS information server 6500 for the remote LS information based on the received information about the neighboring LS information server 6500, in 670.

For example, the remote LS information may include summaries of the LS that are supplied by a region in which the neighboring LS information server 6500 is located, a method of connecting to an LWN of the region in which the neighboring LS information server 6500 is located, a method of connecting to the neighboring LS server 6500, and use of the LS of the region in which the neighboring LS information server 6500 is located.

In 680, the information reception unit 341 receives the remote LS information from the neighboring LS information server 6500. Accordingly, the display unit 342 may display the received remote LS information. In addition, the connection unit 343 may connect to the remote LS selected based on the displayed remote LS information. In this example, the remote LS may be selected by the user through an operation unit (not shown) provided at the terminal or a remote controller for controlling the operation of the terminal 6100.

In 660, if the root server 6400 stores the remote LS information, the root server 6400 may directly transmit the remote LS information to the terminal 6100. In this example, operations 670 and 680 may be omitted. Also, the information reception unit 341 may receive the remote LS information from the root server 6400, and the display unit 342 may display the received remote LS information. Accordingly, the connection unit 343 may connect to the remote LS selected using the remote LS information.

Figure 7:
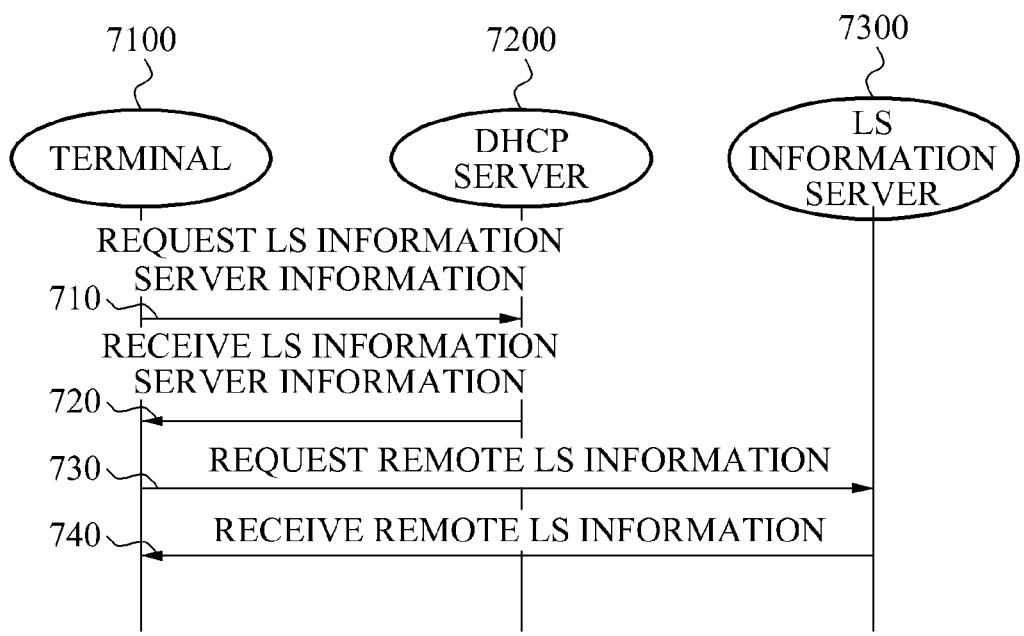
FIG. 7 is a flowchart illustrating an example of a process of a terminal receiving the remote LS information from the LS information server.

FIG. 7 illustrates an example of a terminal receiving remote LS information from an LS information server. In this example, operations 710 to 730 are the same as operations 610 and 630 of FIG. 6, and a further description thereof omitted.

Referring to FIG. 7, the information request unit 330 of terminal 7100 requests the LS information server 7300 for the remote LS information, in 730.

If the LS information server 7300 stores the remote LS information, the LS information server 7300 may transmit the remote LS information to terminal 7100. For example, the LS information server 7300 may share the LS information of the region in which the LS information server 7300 is located, with the neighboring LS information servers located in each region. In this example, the neighboring LS information servers and the LS information server 7300 may share the LS information of the region in which the neighboring LS information servers are located and the region in which the LS information server 7300 is located.

The information reception unit 341 receives the remote LS information from the LS information server 7300, in 740. The display unit 342 may display the received remote LS information. In addition, the connection unit 343 may connect to the remote LS selected using the remote LS information.

Figure 8:
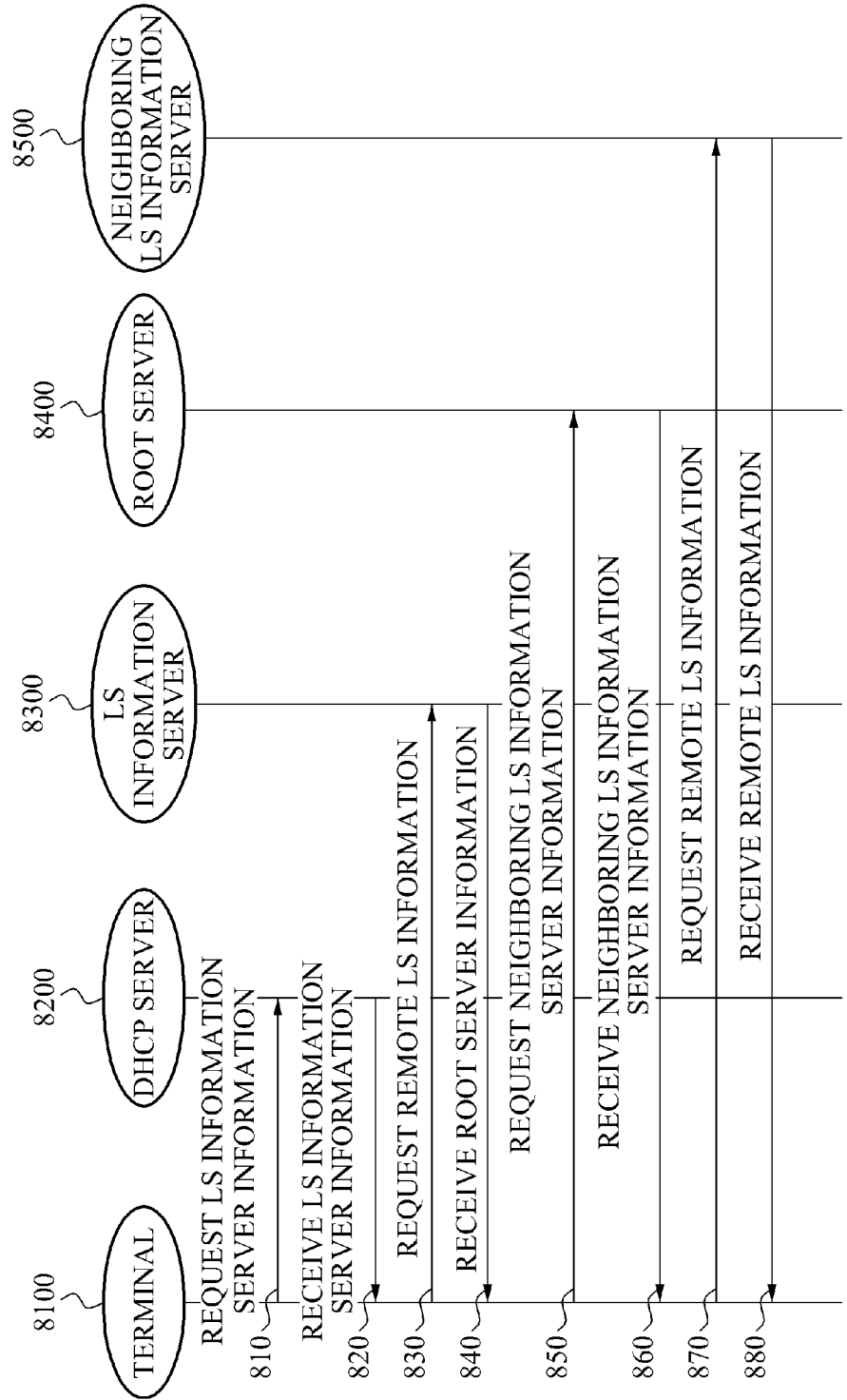
FIGS. 8 and 9 are flowcharts illustrating an example of receiving remote LS information by requesting information from the neighboring LS information server.
Figure 9:
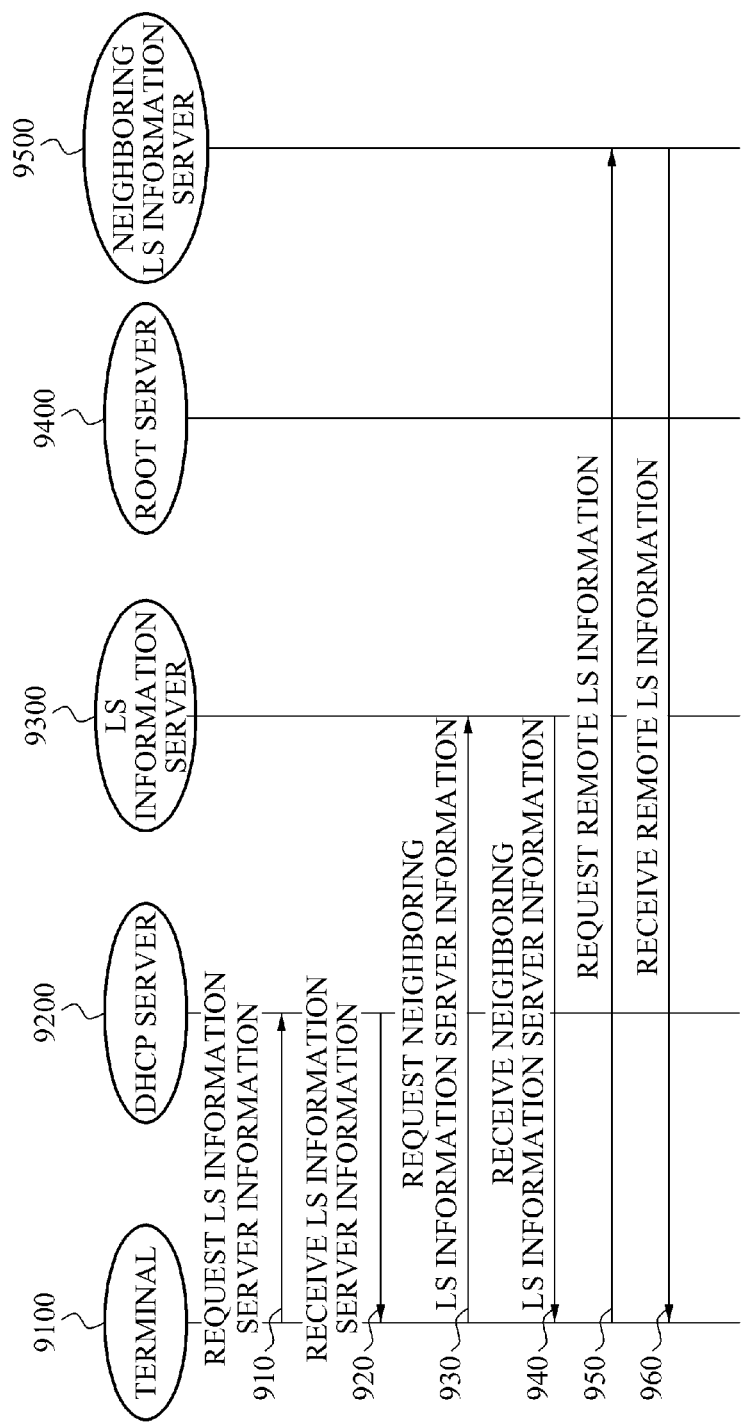

FIGS. 8 and 9 illustrate examples of receiving remote LS information by requesting information about the neighboring LS information server. In the example shown in FIG. 8, a process of receiving the remote LS information based on the information about the neighboring LS information server, instead of the remote LS information, that is requested from a root server 8400 such as shown in operation 650 of FIG. 6. In this example, operations 810 to 840 of FIG. 8 are the same as operations 610 to 640 of FIG. 6, and a further description thereof is omitted.

In 840, the information reception unit 341 of terminal 8100 receives the root server information from an LS information server 8300, in response to the request for the remote LS information.

In 850, the information request unit 330 requests the root server 8400 for the information about the neighboring LS information server 8500 based on the received root server information. For example, the information request unit 330 may request the root server 8400 for the address of a neighboring LS information server 8500 that is located in the region which supplies the remote LS information.

In 860, the information reception unit 341 receives the information about the neighboring LS information server 5500 from the root server 8400.

In 870, the information request unit 330 requests the neighboring LS information server 8500 for the remote LS information based on the received information about the neighboring LS information server 8500.

In 880, the information reception unit 341 receives the remote LS information from the neighboring LS information server 8500. The display unit 342 may display the received remote LS information. If the remote LS is selected, for example, based on the remote LS summaries included in the remote LS information, the connection unit 343 may connect to the selected remote LS using the LWN connection method and the neighboring LS server connection method that are included in the remote LS information.

In this example, if the root server 8400 stores the remote LS information in operation 840, the remote LS information may be directly transmitted to the terminal 8100.

As another example, in 830, the information request unit 330 may request the LS information server 8300 for the information about the neighboring LS information server 8500 instead of the remote LS information.

Referring to the example of FIG. 9, the information request unit 330 of terminal 9100 requests an LS information server 9300 for the information about the neighboring LS information server 9500, in 930, and the information reception unit 341 receives the neighboring LS information server information from the LS information server 9300, in 940. In this example, the information request unit 330 requests the remote LS information from a neighboring LS information server 9500, in 950, based on the received information about the neighboring LS information server 9500. In addition, the information reception unit 341 receives the remote LS information from the neighboring LS information server 9500, in 960.

In FIGS. 6 and 9, because the terminal is aware of the root server information in advance, the information request unit 330 may directly transmit the remote LS information to the root server. For example, because the terminal is aware of the address of the root server, operations 630, 640, 830, and 840 may be omitted. In this example, if the terminal is aware of the root server information in advance, the information request unit 330 may directly request the root server for the neighboring LS information server information.

Figure 4:
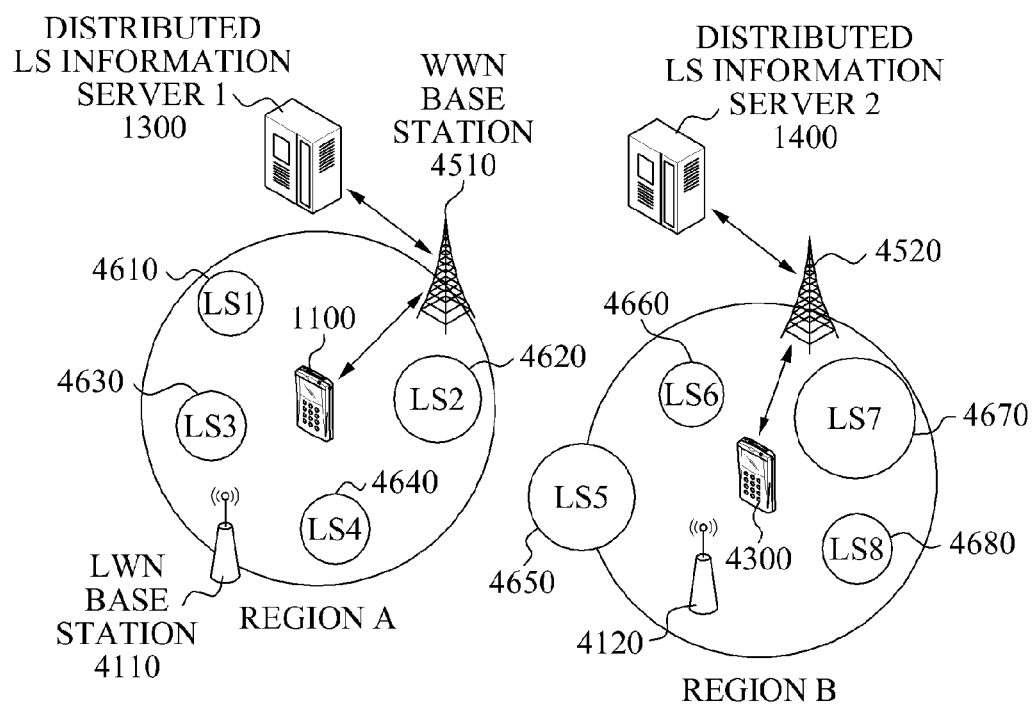
FIG. 4 is a diagram illustrating another example of a distributed network that includes a plurality of distributed LS information servers.
Figure 10:
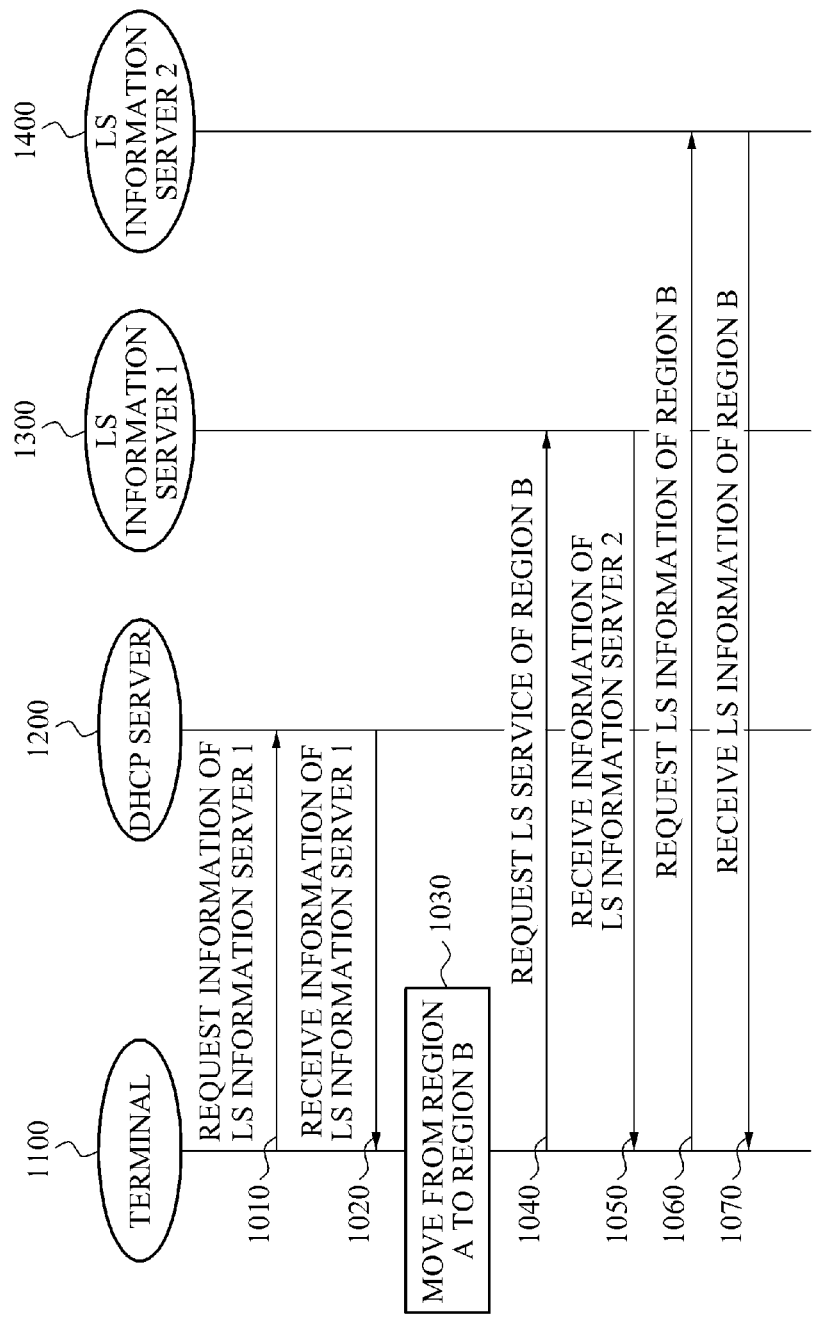
FIG. 10 is a flowchart illustrating an example of process for supplying an LS based on a location change of the terminal in the distributed network of FIG. 4.

FIG. 10 illustrates an example of a process for supplying an LS based on a location change of the terminal in the distributed network of FIG. 4.

Hereinafter, a process of supplying the LS to a terminal 1100 as the terminal 1100 located in region A moves to region B. In this example, a first LS information server 1300 is located in region A and a second LS information server 1400 is located in region B.

Referring to FIG. 10, the information request unit 330 of terminal 100 requests the DHCP server 1200 for information about the LS information server of the region in which the terminal 1100 is located, in 1010. Because the terminal 1100 is located in region A, the information request unit 330 may request the DHCP server 1200 for information about the first LS information server 1300.

The information request unit 330 may request the first LS server information from the DHCP server 1200 located in the WWN. For example, the first LS server information may include an address of the first LS information server. In this example, the information request unit 330 may request the address of the first LS information server.

In 1020, the information reception unit 341 receives the first LS server information from the DHCP server 1200 in 1020. For example, the information reception unit 341 may receive the first LS server information through the WWN.

In the example of FIG. 10, the terminal 1100 moves from the region A to the region B while continuously using the Internet, in 1030. In 1040, the information request unit 330 requests the first LS information server 1300 for the LS information of the region where the terminal is located region.

As a result of the movement of the terminal 1100 from region A to region B, the terminal 1100 may now be located in region B. Accordingly, the information request unit 330 may request the first LS information server 1300 for the LS information of the region in which the terminal is currently located. In this example, the first LS information server 1300 is an LS information server located in region A where the terminal 1100 was located before moving to region B.

The information reception unit 341 receives information about the second LS information server 1400 from the first LS information server 1300, in 1050. For example, the second LS server information may include an address of the second LS information server 1400. In addition, the LS information of region B may already be stored in the second LS information server 1400.

In 1060, the information request unit 330 requests the second LS information server 1400 for the LS information of region B, based on the second LS server information.

The information reception unit 341 receives the LS information of region B from the LS information server 1400, in 1070. Therefore, the display unit 342 may display the received LS information of region B. In addition, the connection unit 343 may connect to an LS of region B that may be selected based on the LS information of region B. For example, the connection unit 343 may connect to the LS of region B selected based on the region B LWN connection method and the second LS server connection method.

In 1050 of FIG. 10, the information reception unit 341 may also receive the LS information of region B and the second LS server information from the first LS information server 1300. In this example, operations 1060 and 1070 of FIG. 10 may be omitted. For example, to receive the LS information of region B and the second LS server information from the first LS information server 1300, the first LS information server 1300 and the second LS information server 1400 may share the LS information of region A and the LS information of region B with each other.

As another example, in 1050 of FIG. 10, the information reception unit 341 may receive the root server information from the first LS information server 1300. Accordingly, the information request unit 330 may receive the LS information of the region B directly from the root server, or from the second LS information server 1400 using the second LS information server received from the root server.

Also, the LS information of region B may be transmitted to the terminal 1100 directly from the first LS information server 1300 that is located in region A. For example, if the first and the second LS information servers 1300 and 1400 share the LS information, and the terminal 1100 moves from region A to region B while continuously using the Internet, the information reception unit 341 may directly receive the LS information of region B from the first LS information server 1300.

Figure 11:
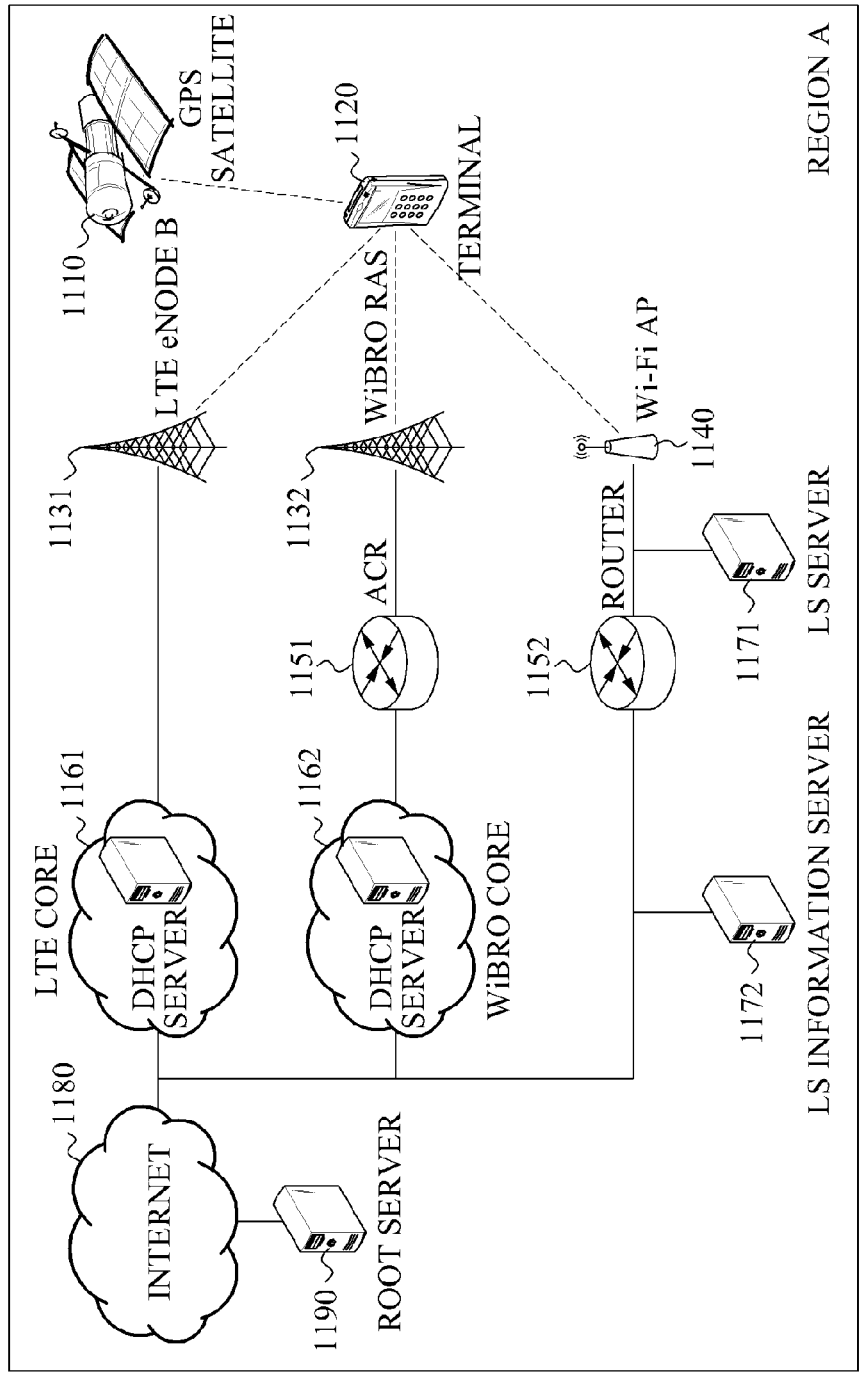
FIG. 11 is a diagram illustrating an example of network in which a terminal located in a pico cell supplies the LS.

FIG. 11 illustrates an example of a network in which a terminal located in a pico cell supplies the LS.

Referring to FIG. 11, the distributed network includes the LWN, the WWN, and the Internet 1180. The LWN may be used to supply the terminal located in the LWN with the LS which is on the basis of a wireless local area network (LAN). The WWN may include a WiBro network. The WiBro network may supply a service that enables a terminal 1120 to connect to the Internet 1180. For example, the terminal 1120 may connect to a WiBro Core network through a WiBro radio access station (RAS) and a WiBro access control router (ACR). The WiBro core network may supply internet access service that enables the terminal 1120 to connect to the internet.

In addition, referring to FIG. 11, the root server 1190 may be located on the Internet 1180. An LS information server 1172 may also be located in the Internet 1180 and may not be subordinate to a specific WWN. An LS server 1171 may be located on the LWN. Hereinafter, a process of supplying the LS by the terminal located in a WiBro Pico cell is further described.

First, an LS search program stored in the terminal 1120 may be executed by the user. For example, the position information acquisition unit 320 of the terminal 1120 may acquire information about a current position of the terminal 1120 from a GPS satellite 120. For example, the terminal position information may include position coordinates of the terminal, and the position coordinates may be expressed by a DMS (Document Management Server) method using a world geodetic system (WGS)-84 coordinates system.

The connection unit 343 may connect to the WiBro core network through the WiBro RAS 1132 and the WiBro ACR 1151.

Accordingly, the information request unit 330 may request the LS server information from the DHCP server 1162 that is located in the WiBro core network. For example, a message requesting the IP setting information may include the terminal position information that is acquired, along with the request for the LS information server information. In this example, the information request unit 330 may request the DHCP server 1162 for the IP setting information including the LS information server information.

The information reception unit 341 may receive the IP setting information from the DHCP server 1162. For example, the IP setting information may include the LS information server information. For example, the LS server information may include an IP address of the LS information server and a TCP/UDP (Transmission Control Protocol/user datagram protocol) port number.

The information request unit 330 may request the LS information server 1172 for the LS information using the LS server information. For example, if the remote LS information is requested, the information request unit 330 may request a neighboring LS information server (not shown) for the remote LS information through the WiBro wireless network and the Internet 1180. Therefore, the LS information server 1172 or the neighboring LS information server (not shown) may transmit, to the terminal 1120, the LS information or the remote LS information, in response to the request by the terminal 1120.

For example, the connection unit 343 may connect to the WiBro core network through the WiBro RAS 1132 and the WiBro ACR 1151 and may acquire the IP address of the LS information server from the DHCP server that is located in the WiBro core network. Accordingly, the information request unit 330 and the information reception unit 341 may acquire the LS information of neighboring regions of the LS information server, from the LS information server. The display unit 342 My display the LS information acquired from the LS information server.

As an example, if a theme park guide service is selected among the displayed LS information, the connection unit 343 may connect to a wireless LAN access point (AP) in which a service set identification (SSID) is LOCAL_WLAN_API1, using the LS information. Therefore, the information reception unit 341 may receive the IP setting information from the wireless AP using the DHCP protocol. The received IP setting information may include, for example, an IP address and a subnet mask. In addition, the connection unit 343 may connect to an LS information server 10.0.0.x using the LS information. Accordingly, the terminal 1120 may use the LS by using the received LS information. In this example, the LS may be supplied in the form of a webpage. For example, a uniform resource locator (URL) of the webpage may be http://10.0.0.x/8080.

Figure 12:
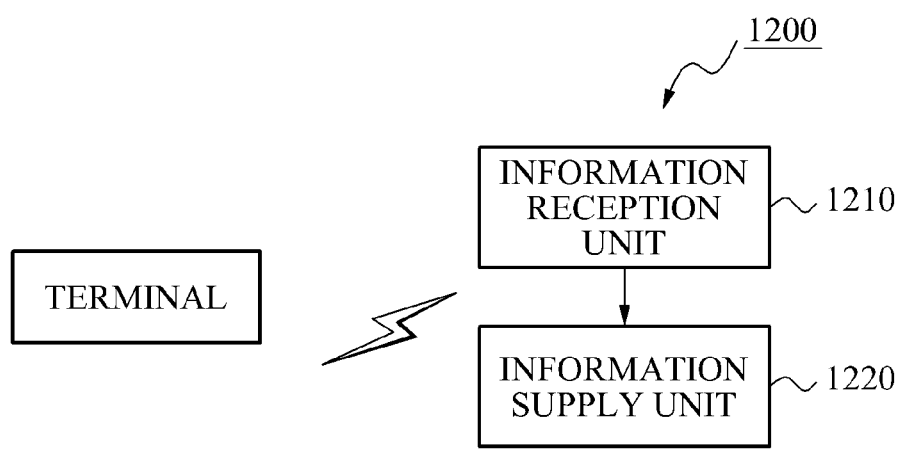
FIG. 12 is a diagram illustrating an example of an LS information server.

FIG. 12 illustrates an example of an LS information server.

Referring to FIG. 12, LS information server 1200 may be a distributed LS information server that is distributed to each region.

An information reception unit 1210 may receive a request, from a terminal or another server, for the LS information of the region in which a terminal is located. For example, the information reception unit 1210 may receive the LS information request in which the terminal position information is inserted. An information supply unit 1220 may transmit the requested LS information to the terminal or to another server.

In addition, the information reception unit 1210 may receive a request for the remote LS information. Accordingly, the information supply unit 1220 may transmit the remote LS information to the terminal in response to the request by the terminal. For example, to transmit the remote LS information to the terminal, the LS information server 1200 may share the LS information with one or more neighboring LS information servers that are located in neighboring regions. The LS information server 1200 may share the LS information of the respective neighboring LS information servers that are located in different regions from the LS information server 1200.

The information supply unit 1220 may transmit the root server information to the terminal, in response to the request for the remote LS information by the terminal For example, the root server information may include the address of the root server. The root server may be a public server which is located in the Internet and which is adapted to store addresses of the plurality of LS information servers that are located in each region in the distributed network.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination to with the program instructions, data files, data structures, and the like. The program instructions recorded on the media may be those specially designed and constructed, or they may be of the kind well-known and available to those having skill in the computer software arts. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules that are recorded, stored, or fixed in one or more computer readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for providing a local service (LS), the method comprising:
   requesting an LS information server for remote LS information, wherein the remote LS information comprises LS information about a neighboring region of a region in which the LS information server is located;
   receiving, from the LS information server, at least one of information about a root server, information about a neighboring LS information server of the neighboring region, and the remote LS information;
   requesting, in response to the information about the root server being received from the LS information server, the root server for at least one of the remote LS information and the information about the neighboring LS information server;
   requesting, in response to the information about the neighboring LS information server being received from the root server, the neighboring LS information server for the remote LS information based on the received information about the neighboring LS information server; and
   receiving the remote LS information from the neighboring LS information server.

2. The method of claim 1, wherein the LS information server is a distributed LS information server.

3. The method of claim 1, further comprising:
   displaying, in response to the remote LS information being received from the LS information server, the remote LS information received from the LS information server; and
   supplying a LS selected from the displayed remote LS information.

4. The method of claim 1, further comprising:
   displaying, in response to the remote LS information being received from the root server, the remote LS information received from the root server; and
   supplying a LS selected from the displayed remote LS information.

5. The method of claim 1, further comprising:
   displaying the remote LS information received from the neighboring LS information server; and
   supplying a LS selected from the displayed remote LS information.

6. The method of claim 1, further comprising displaying the remote LS information,
   wherein the remote LS information includes at least one of summaries of the remote LS, a method for connection to the localized wireless network (LWN), a method for connection with the remote LS server, and use of an LS.

7. The method of claim 1, further comprising:
   requesting a dynamic host configuration protocol (DHCP) server for information about the LS information server based on a region in which a terminal is located; and
   receiving the information about the LS information server from the DHCP server in response to the requested information about the LS information server.

8. The method of claim 1, further comprising requesting, in response to the information about a neighboring LS information server being received from the LS information server, the neighboring LS information server for the remote LS information.

9. The method of claim 1, wherein the LS information server and at least one neighboring LS information server share LS information about the region in which the LS information server is located, and wherein the neighboring region is adjacent to the region in which the terminal is located.

10. A method for providing a local service (LS), the method comprising:
   requesting, in response to a terminal being moved from a region in which an LS information server is located to a neighboring region in which a neighboring LS information server is located, the LS information server for LS information about the neighboring region in which the terminal is moved;
   receiving information about the neighboring LS information server from the LS information server;
   requesting the neighboring LS information server for the LS information about the neighboring region based on the received information about the neighboring LS information server; and
   receiving the LS information of the neighboring region from the neighboring LS information server.

11. A terminal comprising:
   a position information acquisition unit configured to acquire position information of the terminal;
   an information request unit configured to:
      request a local service (LS) information server for remote LS information, wherein the remote LS information comprises LS information about a neighboring region of a region corresponding to the position information,
      request, in response to information about a root server being received from the LS information server in response to the request for the remote LS information, the root server for at least one of the remote LS information and information about a neighboring LS information server for the neighboring region, and
      request, in response to the information about the neighboring LS information server being received from the root server, the neighboring LS information server for the remote LS information based on the received information about the neighboring LS information server; and
   an information supply unit configured to supply the remote LS information.

12. The terminal of claim 11, wherein, in response to the remote LS information being received from the LS information server, the information supply unit displays the remote LS information received from the LS information server and supplies a LS selected from the displayed remote LS information.

13. The terminal of claim 11, wherein the information supply unit comprises:
   an information reception unit to receive remote LS information from the root server;
   a display unit to display the remote LS information received from the root server; and
   a connection unit to connect the terminal to the LS selected based on the displayed remote LS information.

14. The terminal of claim 11, wherein the information supply unit comprises:
   an information reception unit configured to receive the information about the neighboring LS information server from the root server; and
   a display unit configured to display the remote LS information received from the neighboring LS information server.

15. The terminal of claim 11, further comprising a display unit to display the remote LS information,
   wherein the remote LS information comprises at least one of summaries of the remote LS, a method for connection to the LWN, a method for connection with a remote LS information server, and use of a LS.

16. The terminal of claim 11, wherein the information request unit requests a dynamic host configuration protocol (DHCP) server for information about the LS information server based on a region in which the terminal is located.

17. The terminal of claim 11, wherein the information request unit is configured to:
   request, in response to the terminal being moved from the region in which the LS information server is located to the neighboring region, the LS information server for LS information about the neighboring region, and
   request the neighboring LS information server for the LS information about the neighboring region based on the information about the neighboring LS information server.

18. A local service (LS) information server comprising:
   an information reception unit configured to receive position information of a terminal and a request for at least one of remote LS information and information about a neighboring LS information server from the terminal, wherein the neighboring LS information server is located in a neighboring region of a region in which the LS information server is located; and
   an information supply unit configured to supply at least one of the information about the neighboring LS information server and information about a root server,
   wherein, in response to the terminal moving into the neighboring region and the information reception unit receiving a request for LS information about the neighboring region, the information supply unit supplies to the terminal information about the neighboring LS information server.

19. The LS information server of claim 18, wherein the LS information server and the neighboring LS information server are distributed servers, and
   wherein LS information about the region in which the terminal is located is shared with the neighboring LS information server.

20. The LS information server of claim 18, wherein the information supply unit supplies information about the root server to the terminal, in response to the received request for the remote LS information.

* * * * *